March 22, 1949. T. HOLLIS, JR 2,464,865
CUTTING TOOL
Filed Sept. 21, 1944
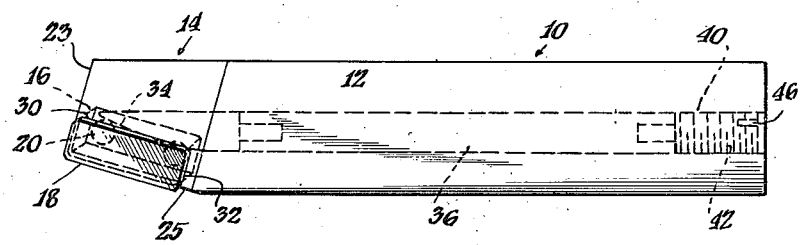
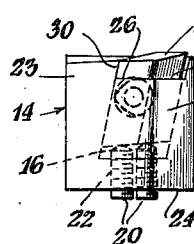
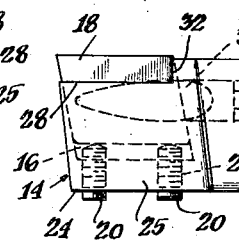
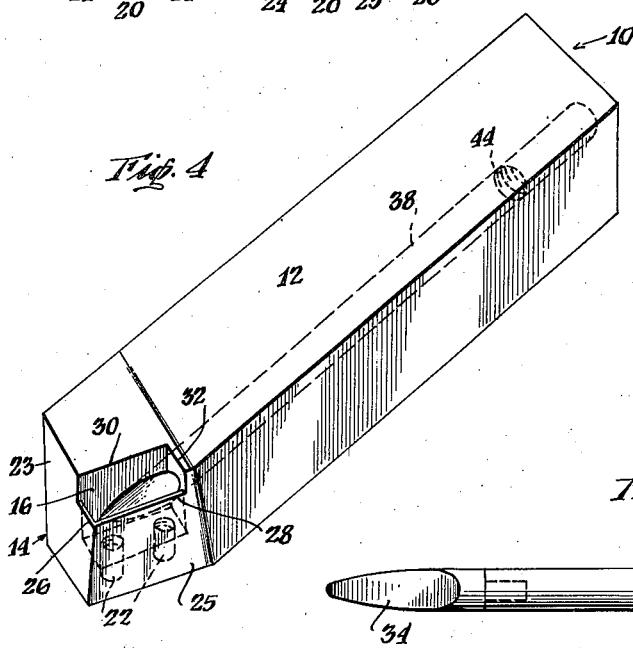
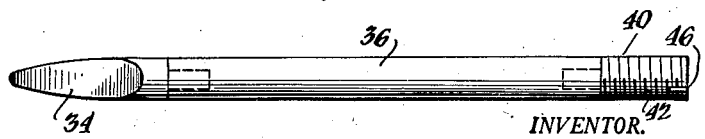
INVENTOR.
Thomas Hollis, Jr.
BY
George H. Corey
ATTORNEY Patented Mar. 22, 1949

2,464,865

UNITED STATES PATENT OFFICE 2,464,865

CUTTING TOOL

Thomas Hollis, Jr., Port Washington, N. Y.

Application September 21, 1944, Serial No. 555,119

5 Claims. (Cl. 29—96)

This invention relates to improvements in hard tipped cutting tools, and particularly to tools of this type wherein a carbide tip is held in cutting position by mechanical means as distinguished from brazing.

In my co-pending application Serial No. 555,118, filed September 21, 1944, which has matured into Patent No. 2,414,811, granted January 28, 1947, I have disclosed an improved carbide tipped cutting tool of the type above mentioned which has proved highly satisfactory as compared with the prior tools in which the carbide tip is held in place by brazing and which is characterized by a novel arrangement of the tip within the holder which insures a better distribution of the stresses set up in the tip during cutting and also provides for adjustments of the tip within the holder that greatly simplify the tool dressing and adjusting operations, insures increased output of machines equipped with such tools and effects marked economies in the amount of carbide material required to effect a given amount of cutting.

The present invention has for an object to further improve the efficiency of cutting tools of the type disclosed in the aforesaid application, as well as to simplify the adjustments of the cutting tip within the holder, and to make possible the use of such tools at much higher speeds than have heretofore been considered possible, as well as to increase the suitability of the tool for making interrupted cuts and for similar purposes where carbide tools have been regarded as unsuited because of the tendency to break when subjected to the shock stresses involved.

A further and important object of the present invention is to provide a carbide tipped tool that may be used under high speed conditions without "chattering" or otherwise setting up undesired vibrations which lead to fracture or chipping of the cutting tip.

As in the aforesaid application, the carbide tip instead of being held flat in the holder is inserted on end and is adjustable upwards as regrinding lowers the height of the cutting edge. The head of the holder is recessed as in said co-pending application, but instead of holding the tip in place by means of screws or screws and a shim, I have discovered that by drilling a hole lengthwise of the axis of the shank and inserting an assembly consisting of a wedge, a suitable plastic rod and a pressure screw, the tip can be held not only in a positive manner with an even distribution of the clamping stresses over the side surfaces of the tip, but also that the plastic expands within the hole when pressure is exerted by the screw with the result that tendency to chatter is greatly reduced or entirely eliminated.

The invention will be more particularly described with reference to the accompanying drawing wherein:

Fig. 1 is an end elevation of a holder embodying the present invention and shows a cutting tip in position therein;

Fig. 2 is a side elevation of the holder of Fig. 1;

Fig. 3 is a top plan view of the holder-tip assembly of Figs. 1 and 2;

Fig. 4 is a perspective view of the holder of the preceding figures;

Fig. 5 is a side elevation of the wedge, plastic rod and pressure screw assembly; and Fig. 6 is a perspective view of an adjustable cutting tip usable in the holder-tip assembly.

As shown in Figs. 1-4 inclusive, the tool holder 10 is outwardly of conventional form and consists of a shank 12 of rectangular cross section provided at one end, hereinafter sometimes referred to as the head 14, with a recess 16 which extends inwardly and downwardly at an angle to the vertical and in a plane intersecting the longitudinal axis of the shank. The recess provides support for the carbide insert 18 on all sides thereof throughout the greater part of its length. Adjusting screws 20 are threaded through holes 22 drilled in the opposite or bottom face 24 of the tool and determine the height of the insert in the recess. Clearance is ordinarily provided by the angle at which the tip is held in the shank thus eliminating or reducing the amount of grinding of the side, end or radius of the head. The angle of inclination of the recess to the vertical may be varied over a considerable range but usually it is preferable to keep the angle as low as possible while at the same time insuring sufficient clearance to enable the cutting edge and radius to be brought into operative position with respect to the work. As shown the axis of the recess 16 is inclined to the vertical both edgewise and lengthwise at an angle of 10°. The end face 23 of the head is shown as inclined downwardly and inwardly at an angle of 6°, and likewise, the slanting side face 25 of the head is inclined inwardly at an angle of 6° to the vertical. As shown the recess 16 is also inclined to the axis of the holder. It will be understood this disposition is not critical and that the recess may lie in a plane paralleling the axis of the holder, in which case the outside dimensions of the head may be suitably altered to insure cutting clearance.

As shown the outer side walls of the recess are cut away as at 26 and 28 to facilitate clearance and permit the tip to be brought into cutting position with the desired cutting clearance with little or no part of the tip projecting above the reenforcing side walls 30 and 32 of the recess. In this way it is insured that the cutting tip is provided with lateral support in the plane of the cutting edge.

The tip is held in a desired adjusted position within the recess by means of an inclined wedge 34 which is detachably connected to the end of the rod 36. The rod 36 is inserted in a hole 38 drilled lengthwise of the shank and extending into the recess 16 and along one side thereof, preferably at a height that will insure that the wedge will be brought into laterally supporting relation to the tip adjacent the plane of the cutaway wall portions 26 and 28. As shown more particularly in Fig. 5 the rod 36 is made of a deformable plastic material, preferably one having only a limited compressability but possessing sufficient resiliency to return to its original shape after being subjected to endwise compression within the bore. Among other materials, various resilient synthetic plastics such as Pyralin and nylon when molded in tube or rod form serve very satisfactorily for the purpose.

As shown in Fig. 5 the rod 36 is provided at its outer end with a member 40 carrying external threads 42 that are adapted to be brought into threaded engagement with internal threads 44 formed in the walls of the hole 38 adjacent the outer end of the shank. The member 40 is provided with a slot 46 for engagement with a screw driver or other adjusting means.

As shown more particularly in Figs. 2 and 3, when the rod assembly is inserted within the hole 38 the wedge is brought into engagement with the side wall of the carbide tip, preferably adjacent or immediately beneath the cut away portions of the walls at 26 and 28. In this way the tip is pressed firmly against the outer wall of the recess and is held rigidly with the cutting point in operative position.

As shown in Fig. 6 the top face of the carbide cutting tip is both laterally and edgewise inclined to the axis of the tip, thus permitting of the use of the cutting tip with different rake angles depending upon whichever of the two positions is assumed by the tip when it is inserted within the recess. If desired the tip may be reversed end for end thereby presenting either one of two other cutting points determined by the third and fourth radii of the tip. In other words a single cutting tip may be employed to present four different cutting angles to the work. It will be understood that cutting radii 50, 51, 52, and 53 will be provided at all four corners of the tip. This may be done before the tip leaves the hands of the manufacturer, thus eliminating hand grinding operations that might be done less expertly when the tip reaches the ultimate user.

By way of example, in one test of the tool above disclosed on a chrome molybdenum steel forging where there was a severe interrupted cut, the tip was used in a double negative position on a #3 Warner & Swasey turret lathe. The operation was to face from the outside into the center of the irregular shaped piece. At first a brazed tool with negative angles was used running at 235 f. p. m., .006″ feed, and $\frac{3}{16}$″ depth of cut. An average of 12 pieces per tool were obtained before the tip broke. This same speed was next attempted with the mechanically held tool and results were only slightly better than with the conventional brazed tool ground with negative angles, twelve to fourteen pieces being obtained without chipping or breakage but the tool dulled. The intermittent cut and negative rake caused considerable pounding and danger of injury to the lathe. The surface speed was then increased to 950 f. p. m. with a feed of .008″ and $\frac{3}{16}$″ depth of cut. Results were a smooth cut, perfectly flat, and tool life was increased to 70 pieces before resharpening. The brazed tool was tried under these conditions and did not finish one piece. The above operation was run dry although it had been previously necessary to use a coolant on the brazed tip.

In another test the positive rake angle was used on carbon tool steel. The operation was a continuous cut at 800 f. p. m., .039″ feed with $\frac{3}{8}$″ depth of cut. The mechanically held tool was used for 50 pieces before sharpening was necessary whereas conventional brazed tools at 300 f. p. m., .015″ feed with $\frac{3}{8}$″ depth of cut produced 6 parts before sharpening was required.

It is worth while to note that the machine stalled twice in the cut with the feed on due to belt slipping with no damage whatsoever to the tool. Stalling in this manner will invariably break a brazed tool and often cause injury to the work. It is also interesting to note that this work was done on a twenty-five year old engine lathe, rebuilt and modernized to handle carbide tools.

Other observations and facts that should be mentioned include complete absence of heat in the parts machined. In all instances the speed with which the chips were removed caused the heat from cutting to be carried away by chips themselves. The extreme speed does not allow time for heat to pass from the chip to the work so that the work being machined will produce blue or even red hot chips yet when the piece is completely machined it is hardly warm to the hand.

It was previously mentioned that no coolant was used. It is obvious that these increased speeds make the application of a liquid impractical. It was found that a coolant did further extend the life of the tip but this increased life did not compensate for the inconvenience caused the operator.

Mention has also been made of a test made on a part with a severe interruption in the cut. In all instances where the mechanically held carbide tip was used under difficult and heavy conditions, no damage was done to the cutting edge.

Many other advantages are realized with the use of my mechanically held type of cutting tool. For an enumeration of some of the more outstanding advantages, reference is made to my co-pending application Ser. No. 555,118, filed September 21, 1944, which has since matured into Patent 2,414,811.

In the application of conventional brazed carbide tools on Lo-Swing and Carbomatic lathes it is invariably necessary to keep the top surface of the tip in the same plane as the top surface of the shank and to maintain a fixed distance between the left side and the point of the tool. It is always necessary to grind or shape the top of the shank after grinding the top of the tip in order to raise the tool to work center. Often it is also necessary to grind or shape the side of the shank in order to maintain fixed distances. With the application of my mechanically held tip all this work is entirely eliminated because the tip can be moved up to compensate for reduction in height.

It is, therefore, obvious that many of the common faults of present carbide tooling are eliminated through the use of my mechanically held carbide insert. Breakage or extreme brittleness of carbide tools is practically eliminated.

The tool may be manufactured with various shapes of holders and the cutting tip may assume many shapes and angles. Conventional chip breakers, of either ground in or the mechanical type can be readily applied. This makes possible high speed operation without danger of injury to the operator.

Present day carbide tool bits when they have to be sharpened require sharpening on three sometimes four surfaces and resharpening of the radius. This sharpening requires some skill and in most cases considerable time. With the use of my mechanically held bit sharpening of one surface only is necessary and sharpening of radii, which is frequently done improperly, is entirely eliminated. Since there are no strains or stresses in the carbide bit there is no danger of cracking due to excessive heat in grinding. Inexperienced people can sharpen the tool by merely holding it on the table of a grinder and pressing it against the wheel or holding it in a vise on a surface grinder. The only necessary adjustment is to set the table or the vise for the top rake angle that is required.

Since the tip is removable from the shank without removing the shank from the machine, resetting of the tip at the same height as originally established will hold size or diameter of the part machined. In original set-ups where it is not determined what grade of carbide to use, the tool may be set up with one grade and if proven unsatisfactory, an identical tip of a different grade may be substituted without removing the tool from the machine.

By the use of the term "carbide cutting tip" and similar expressions herein, it is to be understood that I mean to include all of the cemented carbides suitable for cutting purposes such as tungsten carbide, tantalum carbide, titanium carbide, and various mixed carbides such as tungsten-titanium carbide. While the novel mechanical holding and adjusting features of my invention have been described with particular reference to the use of carbide cutting tips, it will be understood that the holder is capable of use with any of a wide variety of cutting tips which have heretofore been attached to the holder by brazing, among these being such a hard cutting alloy as Stellite and the various high speed alloy steels and, therefore, the invention in its broader aspects is to be understood as including the use of any one of these types of cutting materials in the combination disclosed.

It will be understood that various changes in the details of the construction of the holder and of the associated parts and in the shape and arrangement of the cutting tip and the parts cooperating therewith may be made without departing from the invention which is not to be deemed limited otherwise than as indicated by the appended claims.

I claim:

1. A carbide cutting tool comprising a tool holder having a shank portion adapted to be secured to the tool post of a machine tool and a head portion having a recess adapted to receive a carbide tip in endwise relation therein, said recess having side walls thereof cut away adjacent the face of said head to permit said tip to be brought into cutting position without bringing the cutting edge of said tip substantially above the plane of the remaining side walls of said recess, whereby said tip is reinforced laterally in the plane of the cutting edge when it is in cutting position, and means within said shank and movable axially thereof into wedging engagement with a side wall of said tip within said recess, and means for resiliently urging said member into wedging engagement with said tip.

2. A carbide cutting tool comprising a tool holder having a shank portion adapted to be secured to the tool post of a machine tool and a head portion provided with a recess adapted to receive a carbide cutting tip in endwise relation therein, said recess having side walls thereof cut away adjacent a face of said head to permit said tip to be brought into cutting position without bringing the cutting edge of said tip substantially above the plane of the remaining side walls of said recess, whereby said tip is reinforced laterally in the plane of the cutting edge when it is in cutting position, a carbide cutting tip fitting lengthwise in said recess, and means within said shank and movable axially thereof into wedging engagement with a side wall of said tip within said recess, and means for resiliently urging said member into wedging engagement with said tip.

3. A cutting tool comprising a tool holder having a shank adapted to be secured to the tool post of a machine tool and having a head portion provided with a tip receiving recess, a cutting tip fitting in said recess and clamping means for retaining said tip in said recess, said shank having a bore extending lengthwise thereof and communicating with said recess, a resiliently deformable plastic rod fitted in said bore, and means for applying endwise pressure on said rod to resiliently urge said clamping means against said tip and to expand said rod laterally into pressing engagement with the walls of said bore.

4. A cutting tool holder having a shank adapted to be secured to the tool post of a machine tool and a head portion having a recess extending inwardly from a lateral surface of said head portion and at an angle to an adjacent lateral surface of said head portion sufficient to insure cutting clearance with respect to said adjacent lateral surface for a cutting tip fitted therein, said recess being adapted to receive the cutting tip in endwise position, means for adjusting said tip lengthwise of said recess, said shank having a bore extending lengthwise thereof and communicating with said recess, a wedge adjustable lengthwise of said bore into bearing engagement with a lateral face of said tip, a resiliently deformable plastic rod fitted in said bore and means for applying endwise pressure on said rod to resiliently urge said wedge against said lateral face of said tip and to expand said rod laterally into pressing engagement with the walls of said bore.

5. A cutting tool holder having a shank adapted to be secured to the tool post of a machine tool and a head portion having a recess extending inwardly from a lateral surface of said head portion at an angle to the vertical sufficient to insure cutting clearance when a cutting tip is fitted therein, said recess being adapted to receive a cutting tip in endwise position therein and having the side walls thereof adjacent the face of said head cut away to permit said tip to be brought to cutting position in said recess without bringing the cutting edge of said tip substantially above the plane of the remaining side walls of said recess, whereby said tip is reinforced laterally in the plane of the cutting edge thereof when it is in cutting position, means for adjusting said tip lengthwise of said recess and clamping means for retaining said tip in said recess, said shank having a bore extending lengthwise thereof and communicating with said recess, a resiliently deformable plastic rod fitting in said bore, and means for applying endwise pressure on said rod to resiliently urge said clamping means against said tip and to expand said rod laterally into pressing engagement with the walls of said bore.

THOMAS HOLLIS, Jr.

REFERENCES CITED

The following references are of record in the file of this patent:

UNITED STATES PATENTS

| Number | Name | Date |
|---|---|---|
| 1,346,056 | Poulain | July 6, 1920 |
| 1,793,564 | Severson | Feb. 24, 1931 |
| 2,140,940 | Reaney | Dec. 20, 1938 |
| 2,203,104 | Reaney | June 4, 1940 |

FOREIGN PATENTS

| Number | Country | Date |
|---|---|---|
| 3,668 | Great Britain | June 7, 1906 |
| 465,537 | Great Britain | May 10, 1937 |
| 117,469 | Australia | Sept. 16, 1943 |